Sept. 8, 1942.  H. H. MEYER  2,295,091
SWEEP RAKE
Filed May 6, 1941   4 Sheets-Sheet 1
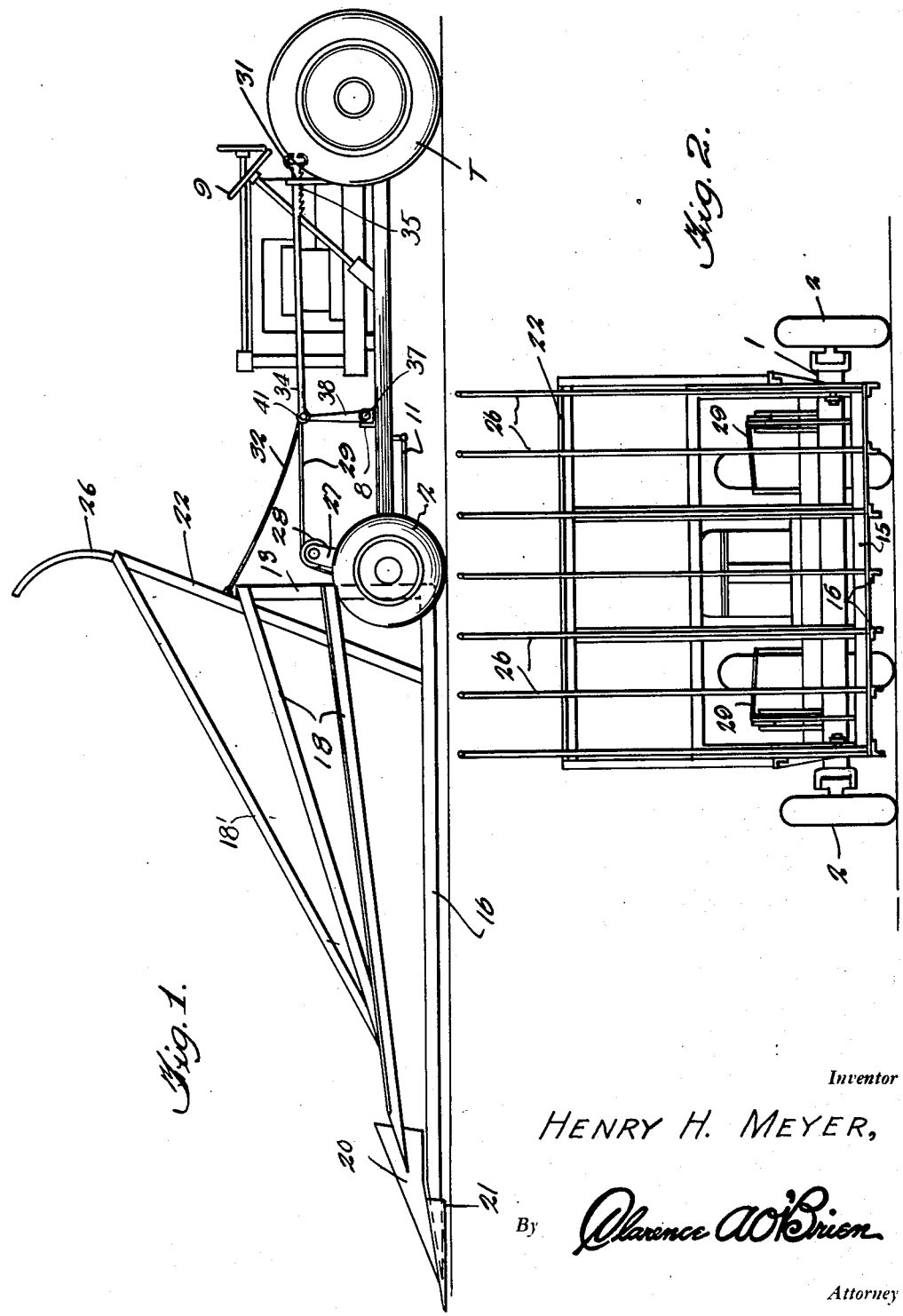
Inventor
HENRY H. MEYER,
By Clarence A. O'Brien
Attorney

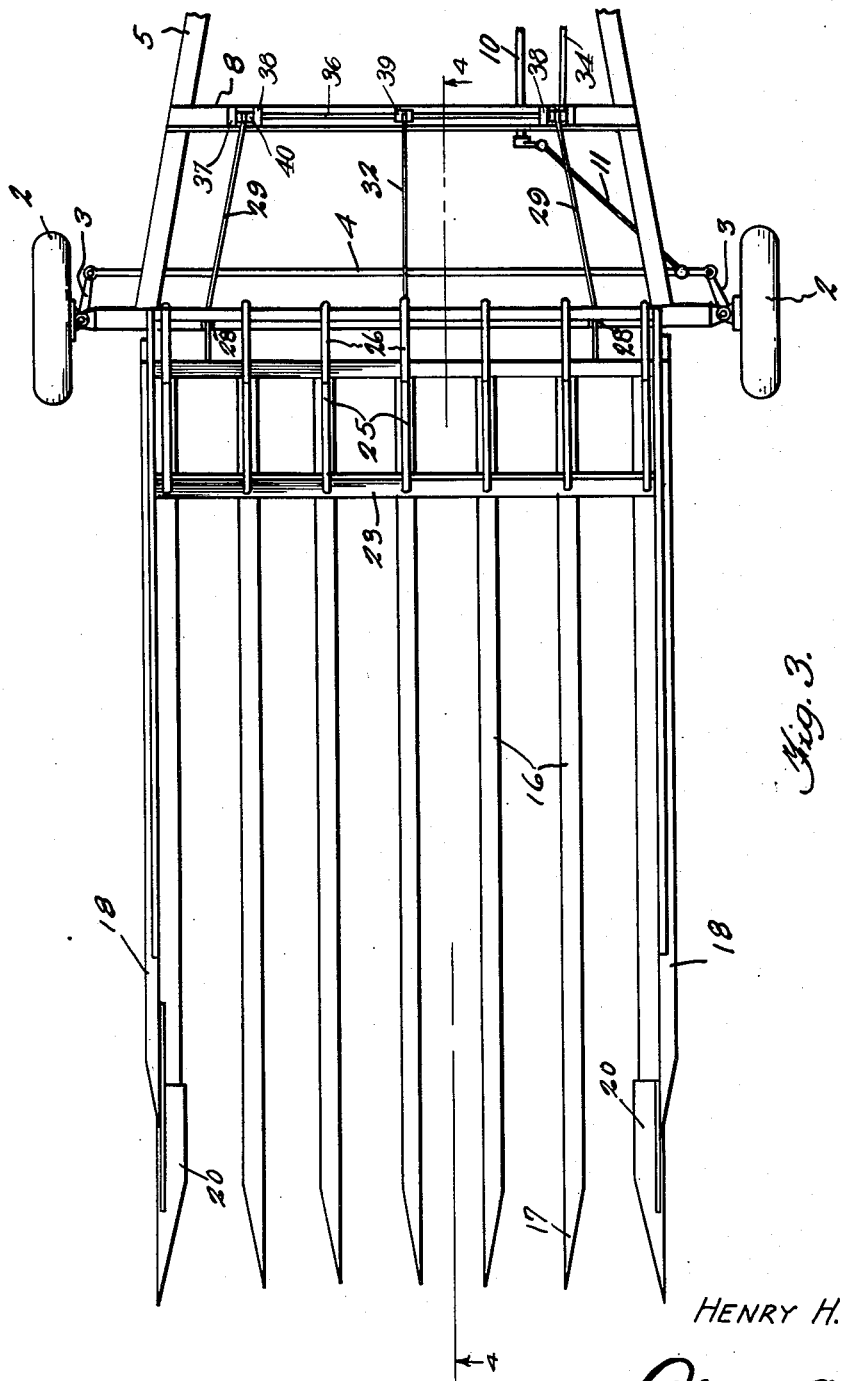

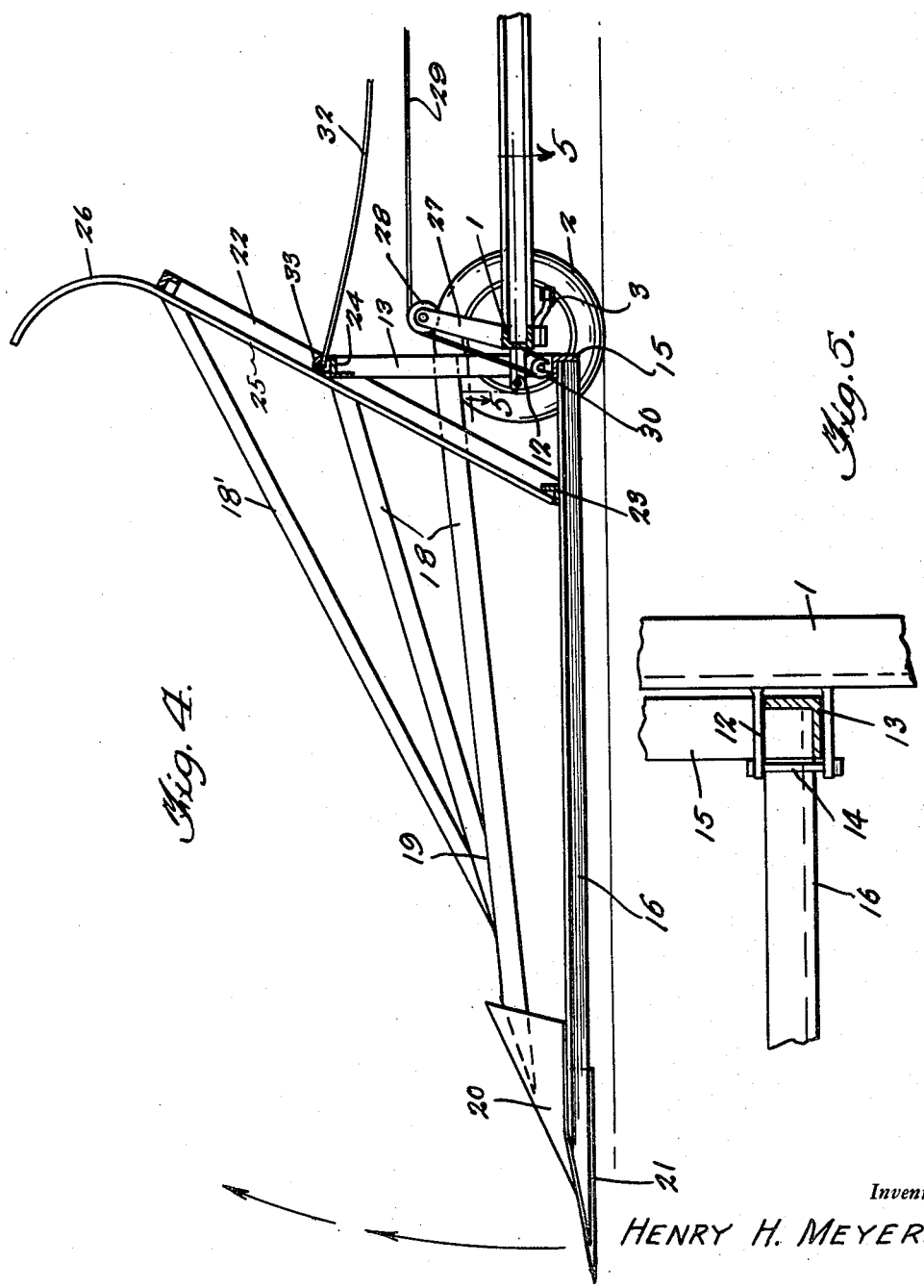

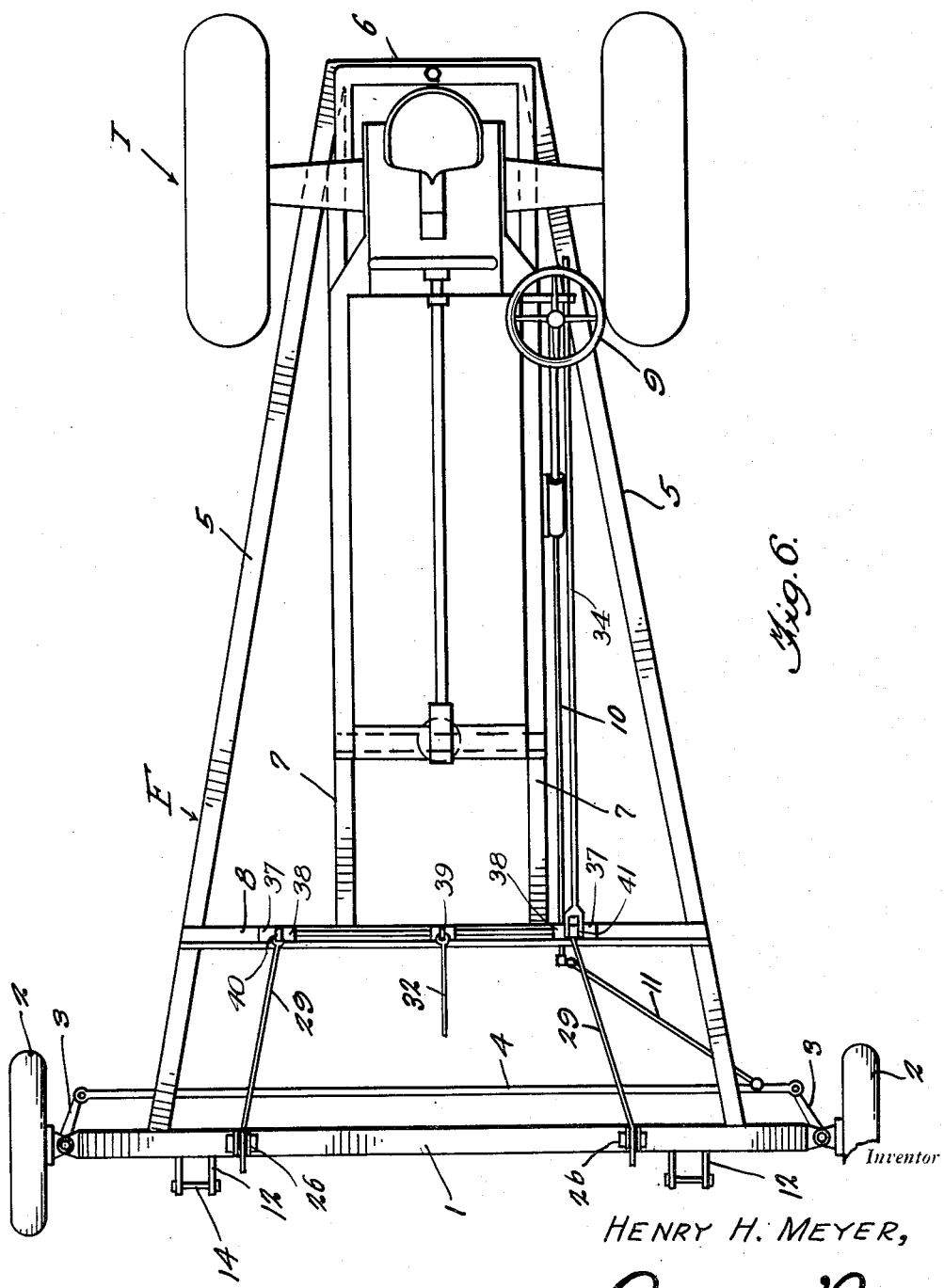

Patented Sept. 8, 1942

2,295,091

UNITED STATES PATENT OFFICE 2,295,091

SWEEP RAKE

Henry H. Meyer, Covington, Ohio

Application May 6, 1941, Serial No. 392,160

2 Claims. (Cl. 56—27)

This invention relates to a sweep rake for attachment to the front of a tractor or truck, the general object of the invention being to provide means whereby the fingers of the rake can be caused to travel along the ground so as to readily pick up material or by backing the vehicle the fingers can pass from under the material, with means for tilting the device when loaded so that it will carry the load with the least possible strain on the parts of the device and on the vehicle.

Another object of the invention is to provide means whereby the device can be readily attached to the vehicle or detached therefrom.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevational view showing the invention applied to a tractor.

Figure 2 is a front view.

Figure 3 is a top plan view with the tractor removed.

Figure 4 is a section on the line 4—4 of Figure 3.

Figure 5 is a section on the line 5—5 of Figure 4.

Figure 6 is a top plan view with the rake assembly removed.

In these views the letter F indicates a frame which includes an elongated axle 1 having the spindles at its ends for the wheels 2, the spindles being pivotally connected with the ends of the axle and having arms 3 thereon which are connected together by the tie rod 4 so that by moving the rod 4 longitudinally the wheels can be turned to steer the device in the well known manner. The frame also includes rearwardly converging side members 5 which terminate in an end piece 6 and this end piece is adapted to be connected to the draw bar or rear portion of a tractor T as shown more clearly in Figure 6. The front axle of the tractor is removed and its side bars 7 are connected to a cross bar 8 which connect the bars 5 together as shown in Figure 6. I prefer to make this bar 8 adjustable so that it can be moved rearwardly or forwardly on the bars 5 to suit tractors of different lengths. The steering wheel 9 of the tractor is connected to the rod 10 which, in turn, is connected by the linkage 11 with the bar 4 so that by turning the wheel 9 the wheels 2 can be turned to steer the apparatus.

Pairs of ears or lugs 12 extend forwardly from the axle 1 for receiving the upright bars 13 of the rake assembly and these bars are held in place by the bolts 14 which pass through holes in the lugs or ears. Thus by removing these bolts the rake assembly can be released from the frame part shown in Figure 6. A lower cross bar 15 is connected with the lower ends of the upright bars 13 and a plurality of fingers 16 have their rear ends connected with the bar 15 and these fingers extending forwardly and terminating in points 17 which are preferably arranged as shown in Figure 3. Side rails 18 extend forwardly from the upright bars 13 with the lower rail of greater length than the upper rail and said lower rail is located in spaced relation above the outer finger 16 while the upper rail 18 slopes downwardly and forwardly and is connected to a forward part of the lower rail as shown at 19. A guard 20 is connected with each outer finger 16 by having a socket 21 in its lower part for fitting over the front end of the outer finger and the body part of the guard extends upwardly and rearwardly with its rear portion extending inwardly along the inner edge of the lower rail 18. These guards are not connected with the side rails but these guards allow the free movement of the fingers up and down and they also prevent the lodging of hay or grain on the side rails. A substantially rectangular-shaped frame 22 slopes upwardly and rearwardly from a cross bar 23 extending across the rear portions of the fingers 16 and an intermediate part of the frame 22 rests against a cross bar 24 which connects the upper end of the upright bars 13 together, the frame extending well beyond the upper ends of the bars 13. Spaced upright fingers 25 are connected to the front face of this frame 22 with their upper ends extending above the frame and curving upwardly and forwardly as shown at 26. Side rails 18', similar to side rails 18, extend forwardly and downwardly from the sides of the frame 22.

Uprights 27 are attached to the axle 1 and have pulleys 28 at their upper ends. Cables 29 are connected at their front ends to the front axle and pass downwardly under pulleys 30 on the cross bar 15 and then the cables pass upwardly over the pulleys 28 from which they pass rearwardly to suitable operating means shown generally at 31 on the tractor. Another cable 32 is connected to parts 33 on the bar 24 and this cable also passes rearwardly on the tractor. As will be seen by slackening the cables 29 the rake assembly will drop by having the bars 13 slide to the lugs 12 and the bolts 14 until the fingers rest upon the ground, the sockets of the guards 20 acting as runners but by pulling the cables 29 the rake assembly is lifted so that the fingers will be above the ground and substantially parallel thereto. Then upon pulling the cable 32 the rake assembly will be tilted so that the fingers 16 will extend upwardly and forwardly and the frame 22 and the fingers 25 will be tilted rearwardly at a greater angle than that shown in Figures 1 and 4 and thus the load will be carried by the rake assembly.

The operating means 31 may comprise a pull rod 34 equipped with a ratchet lock indicated at 35. In front of the tractor is a transverse rock shaft 36 journaled, as at 37, on the cross bar 8. Fast on the shaft 36 are two upstanding side crank arms 38 and an intermediate similar arm 39. The cables 29 are connected to the upper ends of the side crank arms 38, respectively, as indicated at 40. The cable 32 is similarly connected to the intermediate crank arm 39 with a slack in the same in the fully lowered position of the fingers 16 for tilting of the rake assembly subsequently to lifting of the same. The pull rod 34 is pivoted at one end, as at 41, to one of the side crank arms 38 for operation of said arm by the rod and hence operation of the remaining crank arms, as will be clear. As will be obvious, rearward swinging of the crank arms 38, 39 first exerts pull on the cables 29 and subsequently on the cable 32 so that the rake assembly is first raised and subsequently tilted.

When the device is lying flat on the ground the entire length of the fingers can follow the ground at automatic ground pressure, thereby permitting loose hay or sheaves or shocks to travel the entire distance to rear of the rake before any resistance is produced to the movement of the material and this causes much less shattering of leaves from alfalfa or other hay and grain than with devices now in use. By having the fingers connected to the front of the frame 22 and eliminating all cross slats and by having these fingers extend upwardly and rearwardly the material can slide and roll upwardly over the fingers without resistance so that the loading capacity of the device is increased. After the device has been loaded the operator can lift the rake assembly and tilt the same so as to carry the load without undue strain on the fingers 16 as the rear uprights and the axle 1 will carry the strain. Since the rear of the rake assembly can be lifted to a considerable height clearance is provided as great as the axle of the tractor or truck has and this facilitates the traveling of the apparatus over roads. The lifting of the rake assembly with the fingers extending upwardly and forwardly enables the operator to readily turn the tractor to enter roads, lanes or the driveways of ordinary farm widths because the ends of the fingers will clear the tops of fences and the like. When it is desired to unload the rake assembly is dropped until the fingers 16 rest upon the ground and then the vehicle is backed so that the fingers will move from under the load.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. An apparatus of the class described comprising a wheel supporting frame, a rake assembly including uprights slidably supported at the front of the frame, substantially horizontal fingers extending forwardly from the lower part of the uprights, a bar connecting the rear ends of the fingers together and connected with the lower ends of the uprights, forwardly extending side bars connected with the uprights, a frame extending upwardly and rearwardly from the rear portions of the fingers above said uprights, upright fingers connected with the front of said frame and having their front ends extending forwardly and upwardly, means for raising and lowering the uprights to cause the fingers to engage the ground or to be raised above the ground and means for tilting the rake assembly to cause the fingers to extend upwardly and forwardly and operative by the means first mentioned.

2. In an apparatus of the class described, a wheel supporting frame including a front axle, lugs extending forwardly from the front axle and arranged in pairs, uprights slidably arranged between the lugs, bolts for holding the uprights in the lugs, a lower cross bar connecting the lower ends of the uprights together, forwardly extending fingers connected with the lower bar and having pointed front ends, side bars connected with the uprights and arranged above the outer fingers, guard members connected with the pointed ends of the outer fingers and passing inwardly of the front ends of some of the side bars, an upwardly and rearwardly extending frame supported by the fingers and the uprights, upwardly extending fingers carried by the frame on its front face, means for raising and lowering the rake assembly and means for tilting the same operative by the first-mentioned means.

HENRY H. MEYER.